Sept. 23, 1958 C. R. HANNA ET AL 2,853,090
PILOT VALVE MEANS FOR HYDRAULIC APPARATUS
Original Filed Oct. 28, 1952 2 Sheets-Sheet 1

INVENTORS
Clinton R. Hanna &
Lawrence B. Lynn
BY
ATTORNEY

United States Patent Office 2,853,090
Patented Sept. 23, 1958

2,853,090

PILOT VALVE MEANS FOR HYDRAULIC APPARATUS

Clinton R. Hanna and Lawrence B. Lynn, Pittsburgh, Pa., assignors to Westinghouse Electric Corporation, East Pittsburgh, Pa., a corporation of Pennsylvania Original application October 28, 1952, Serial No. 317,215. Divided and this application September 8, 1955, Serial No. 533,110

5 Claims. (Cl. 137—82)

This invention relates generally to a pilot valve means for hydraulic devices and systems which are utilized in moving and/or controlling a body and is a division of applicants' copending application Serial No. 317,215, filed October 28, 1952, entitled Hydraulic Apparatus and assigned to the present assignee.

Apparatus of this general type frequently utilizes a power piston having a mechanical connection with the body to be controlled for controlling the movement of the body in dependence of movement of the piston. In some applications, force is applied to the body by the piston in one direction only, there being some other means for returning the body to a given neutral or starting position. In other instances, force is applied to the body in each of two directions by the piston to effect reversible movement of the body.

In such hydraulic drives fluid under pressure is supplied to the piston from a supply of fluid pressure through the medium of a system of valves which may be manually or automatically controlled to obtain the desired operation of the body. The requirements of such a drive may vary in certain respects from one application to another but as a general proposition it is desirable that high speed, high power performance be obtainable together with a minimum dead band in the vicinity of zero error. Moreover, a system such as this should be relatively stable, which indicates a degree of damping commensurate with system stiffness. Other important considerations in most applications include compactness, lightness of weight, ease of manufacture, serviceability and durability to mention a few.

Accordingly, one object of this invention is to provide a high-speed high-power hydraulic control.

Another object of this invention is to provide a hydraulic control having a negligible dead band about neutral position.

Yet another object is to provide a high speed control having a small dead band and low quiescent fluid flow for use with a source of hydraulic energy maintained at high pressure.

It is also an object hereof to provide arrangements in which quiescent control or pilot pressures or their effects on the average pressure of a system associated therewith are minimized.

An ancillary object of this invention is to provide a hydraulic control device which is easily manufactured and which has a long useful life requiring a minimum of maintenance.

More specifically, it is an object of this invention to provide a magnetically controlled hydraulic control as generally mentioned in which system damping is achieved at the magnetic means.

Further to the preceding object, it is also an object hereof to provide a movable magnetic means in a hydraulic control, for controlling fluid flow, in which movement of the magnetic means is damped.

Additionally, it is an object hereof to provide a magnetically operated valve in which movements of the valve control member are damped.

In respect of the preceding object, it is an object hereof to provide a magnetic controller or driver for a member to be controlled in which the driver or movable member is biased to a given position and movement therefrom is damped.

The foregoing statements are merely illustrative of the various aims and objects of this invention. Other objects and advantages will become apparent from a study of the following disclosure when considered in conjunction with the accompanying drawings, in which.

Figure 1:
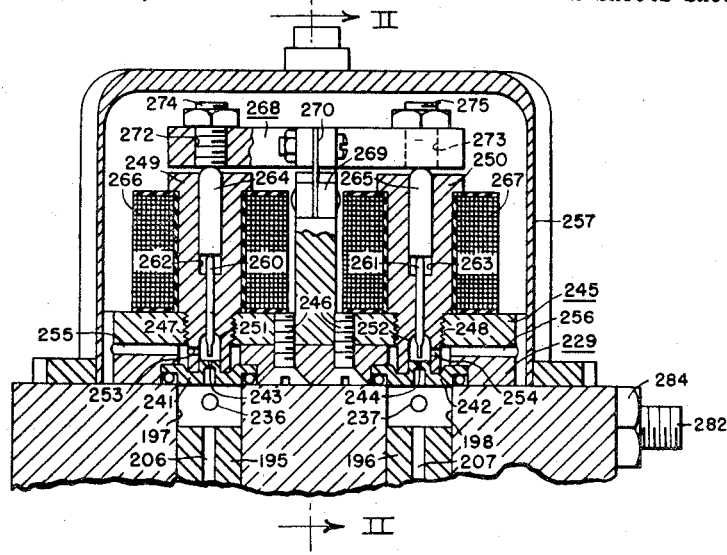
Fig. 1 is a sectional view of the electrically operated pilot valve of this invention.
Figure 2:
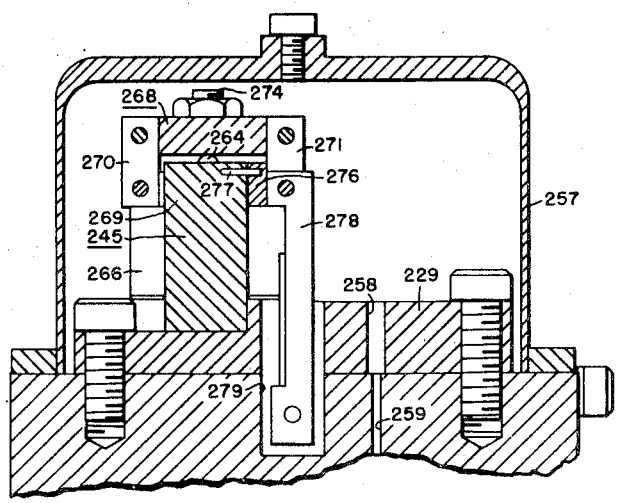
Fig. 2 is a sectional view of the pilot valve taken on line II—II of Fig. 1.

The pilot valves of this invention, which control the pilot pressures applied to the pistons of power valve, not shown, comprises respective valve bodies 241 and 242 which are secured in respective counterbores in top plate 229 over the ends of respective cylinders 197 and 198. Orifices 243 and 244 in the respective pilot valve bodies permit pilot pressure fluid to flow upwardly therethrough. In this application the magnetic controller again comprises an inverted T-shaped support 245 which is secured by screws 246 to a recessed section in top plate 229. Threaded holes 247 and 248 which are coaxially disposed of the pilot valve orifices threadedly receive the bottom ends of magnet cores 249 and 250, respectively. These respective magnetic cores 249 and 250, respectively. These respective magnetic cores are provided with respective open-ended cavities 251 and 252 in the bottom ends thereof which seat about the respective orifices 243 and 244. These cavities are vented by respective passages 253 and 254, opening through the sides thereof, communicating with respective passages 255 and 256 which pass laterally through the top plate 229 and exhaust into space between the circumferential face of this plate and the cover 257, which is sealed thereabout, against the top face of the valve body 174.

The pilot valve discharge fluid which accumulates in this top cover is drained through coaxially disposed passages 258 and 259, respectively, through the top plate and valve body 174 into passage 238 which communicates with the sump.

The pilot valves are controlled by respective stems 260 and 261 which slide in vertical concentric bores in the respective magnet cores 249 and 250. The reduced diameter bottom ends of the respective stems 260 and 261 which are flat ended, present a face which is normal to the axis of the associated pilot valve orifices 243 or 244. These faces are of a diameter slightly larger than the pilot valve orifices to seat thereover, as required, and seal the valves. The upper ends of the respective stems 260 and 261 terminate in counterbores 262 and 263 in the associated magnet cores in which respective plungers 264 and 265 are slidably fitted.

Magnetizing coils 266 and 267 are fitted about the respective magnet cores. The actuating means of the magnetic controller or driver is represented in an armature assembly, generally designated 268, which is pivotally mounted, substantially at its center, to the top end of leg 269 of inverted T-shaped member 245 by means of respective flat springs 270 and 271. Threaded holes 272 and 273, which are respectively adjacent opposite ends of the armature assembly, are substantially coaxially disposed of the axis of respective plungers 264 and 265 and receive adjusting screws 274 and 275, respectively, the bottom ends of which abut the spherical upper ends of the respective plungers under operating conditions and thereby control the spacing of the flat bottom ends of the respective valve stems with respect to the pilot valve orifices to control fluid flow therethrough.

Armature spring 271 is mounted on a pad 276 at its bottom end which is pivotally connected to the upper extremity of leg 269 of the inverted T-shaped member by means of a pivot pin 277. Also connected to pad 276 is a flat relatively non-flexible arm 278 which projects downwardly therefrom into a cavity 279 extending through the top plate 229 into the body of a valve 174. An inverted U-shaped spring member 280 is fastened to the bottom end of the arm 278, its other leg being deflected outwardly at 281 to abut one side of the cavity 279. An adjusting screw 282 is threaded into a suitable opening through the side of the valve body which opens into the cavity 279. The end of this adjusting screw abuts the lower end of arm 278 forcing this arm in a direction against the bias of U-shaped spring 280. A fluid-tight seal betwen the adjusting screw and the valve body is provided by means of O-ring 283 which is secured in a recess in the body of the screw. The screw is locked in any desired position by means of a nut 284 which threads over the end thereof projecting from the valve body. The use of this screw in displacing arm 278 against the bias of spring 280, turns pad 276 against pivot 277 and applied a deflecting force or a bending moment to flat spring 271 which mounts one side of the armature. This force applied through the armature to the other spring 270 forces angular displacement of the armature in such amount as may be needed so that the pilot valves may be adjusted to produce substantially equal pilot pressures under quiescent conditions. The spring mounting of the armature also provides a positive centering means which is opposed to the negative stiffness of the magnets. Such features as this, together with the damping of the pilot valves afforded by the two-piece construction in the operating means represented in the pilot valve stems and associated plungers, will be discussed at a later point.

It will be appreciated from an examination of the embodiment of the figures that this valve is applicable in any system to which hydraulic pilot control is needed.

The functional aspect of the valve may be better appreciated by considering in detail the functional aspects of a magnetic driver or controller as best seen in Fig. 1.

Under quiescent conditions, equal average currents in the coils of the symmetrical magnet supply polarizing flux to the magnetic driver. Assuming geometric and magnetic symmetry, the magnetic forces will be in equilibrium when the armature is centered with equal air gaps. If the armature of the magnetic controller or driver is displaced from the balanced position described, the flux increases in the magnetic circuit branch having the decreasing air gap between the core and armature and decreases in the other branch producing a torque in the direction of the displacement. The fluxes in these branches of the magnetic circuit vary inversely as the air gaps and the armature forces vary as the square of the fluxes to produce a net torque which is proportional to the square of the armature displacement at the air gaps. If this is considered as a centering effect, this square law stiffness is negative in sign, that is, the greater the displacement of the armature from centered position, the greater is the net torque which therefore holds the armature from its centered position.

Assuming that the pilot valves are adjusted for equal average openings when the armature is centered, which openings as a practical matter are not less than ⅛ the diameter of the orifices of the pilot valves at the armature position for which the air gaps are equal, as the armature is displaced, the pilot valve stems which bear against it are also displaced. In that branch of the control circuit in which the pilot valve is closing, the pressure rises and in the other branch the pilot pressure drops.

With average biasing current of the correct magnitude, the positive hydraulic stiffness is higher than the negative magnetic stiffness, if the average valve gap is smaller than the average magnetic air gap on the basis considered at an earlier point. If these conditions obtain, the net stiffness is positive and the valve centers to equalize control pressures.

However, this condition may not be realized in practice due to certain effects, such as fringing and local spot area saturation in the magnetic circuit which alter the flux pattern, but more appreciable deviations may occur in the hydraulic circuit. These deviations may be accounted for, at least in part, by the effect of a power valve system on the dynamics of the pilot valve. The volume rates of fluid past the pilot valves is altered by the motion of the power valve piston operators of a system in a sense to augment the flow past the pilot valve whose opening or orifice area is increasing and to diminish the flow past the other valve whose area is decreasing. This may be understood by reference to Fig. 1 wherein assuming counterclockwise tilting of armature 268, the area of the orifice of pilot valve 244 is increasing as that of pilot valve 243 is decreasing. Displacement of any power valve associated with the pilot valve 243 increases the volume of associated pilot valve circuit and conversely displacement of any discharge valve associated with the pilot valve 244 results in a decrease in pilot circuit volume. During this transient condition, the volume rate of fluid flow through pilot valve 244 is augmented by displacement of the associated discharge valve into the pilot pressure circuit while, at the same time, due to the volume increase in the pilot pressure circuit associated with pilot valve 243, a slight decrease in volume rate of fluid transfer through the pilot valve 243 occurs. The effect of this situation produces a dynamic reduction of the steady-state positive-stiffness described above.

The positive stiffness may further be impaired by the flow patterns past the valves. The flow patterns are such that effective pilot valve area reduction occurs as a function of the volume rate and linear velocity of fluid past the valves.

A third effect affecting positive valve stiffness is the forces arising from the flow of fluid through the orifice and impinging on the pilot valve end face. This force is a function of the volume rate and fluid velocity.

These dynamic stiffness effects may be relatively quite large and their effect in the system may be minimized by reducing the average biasing current on the magnet coil which embodies a requirement for class B pilot control signals rather than class A, which is generally more desirable, or the magnetic air gap may be increased to several times the pilot valve opening so that the magnetic negative stiffness is reduced in order that the pilot valves may be positively centered.

These three factors also introduce negative damping to the pilot valves. The negative damping is effected by the pilot valve dimensions and configurations, operating pressures and constants of the operating pistons of the power valves and their associated loads. It can produce a condition of valve singing usually at high frequency to produce control circuit pressure modulations that can be very undesirable.

In the case of the control of the pilot valves afforded by the magnetic driver, the flow direction of the pilot pressure fluid through the respective pilot valves is in the direction of valve opening movement, and, therefore, as one of the pilot valves approaches closed position due to the driving force of the armature, the tendency of the valve to close due to the dynamic flow characteristics as described, may result in complete closing of the valve. The force to close the valve under dynamic flow conditions is less than the force required to hold the valve closed when the flow of fluid stops. If the armature force is just below the required force to hold the valve closed, the fluid force acting on the valve stem forces the valve open, and the dynamic flow conditions again obtain and the armature force closes the valve. Thus, a condition of oscillation of the pilot valve system and its driver is initiated and will take place at a frequency depending primarily on the inertia of the moving parts and the forces which are acting on them. This dynamic flow condition, when considered with the geometry of the magnetic drive, is, therefore, a condition of negative damping with respect to valve stem motions.

The negative damping may be cancelled by applying a positive damper to the armature of the magnetic driver having an equal or higher damping rate. Such cancellation, while effective, is not uniform since the negative damping rate is not linear. Therefore, as a general proposition, a high positive damping rate at the armature is required in excess of the maximum negative damping rate to achieve stability. If the positive damping is excessive, the armature travel in response to control signals will be delayed, thereby impairing the over-all speed of response of the valve. Stable performance is obtainable in this manner for certain applications not requiring high speeds of response.

Figure 3:
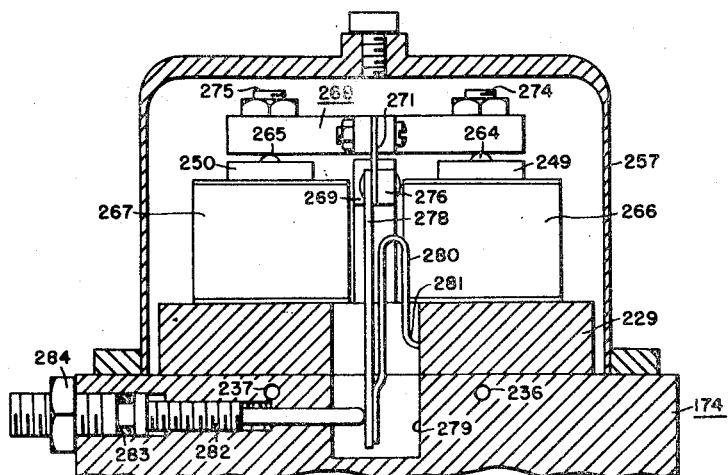
Fig. 3 is a sectional view of the pilot valve, as viewed from the direction opposite to Fig. 1.

Pilot valve stability in the presence of negative damping may be improved in another manner, namely, by the addition of auxiliary mechanical springs about the armature rotational axis. This expedient is illustrated in spring 270. Such a centering spring reduces the relative magnitude of the negative stiffness and tends to restrain the induced valve motions to zones in which the negative damping rates are less than otherwise encountered. Auxiliary centering springs also improve the armature positional accuracy under quiescent conditions since the linearity of the mechanical springs prevents the centering stiffness from approaching zero at the armature equilibrium position. The springs may be adjusted as illustrated in the embodiment of Fig. 3 to compensate for any valve or circuit irregularities which will produce output pressure differences for quiescent conditions if uncorrected.

However, the auxiliary or centering springs may adversely effect the linearity of pilot valve response. Generally, the valve clearance is adjusted for class C operation in order to obtain lower quiescent output pressure, in which case, about the equilibrium position armature travel per unit pressure change is higher than at either end position. The mechanical spring rate is, of course, linear and correspondingly absorbs a larger portion of the applied signal force at low levels than at higher signal amplitudes. Accordingly, the pilot valve system will tend to be less sensitive about the balanced position than at either limit of pressure range. This non-lienar sensitivity produces a distortion that on a sinusoidal input signal results in a peaked wave form of pressure output. Here again, however, acceptable performance has been obtained for some applications.

A presently preferred solution to the problems of pilot valve stability and positional centering accuracy has been illustrated in the figures and involves using both auxiliary springs on the armature and viscous damping on the moving pilot valve members or stems. Optimum valve performance has been obtained with this combination which permits, in general, very appreciably lower damping rates and stiffness rates with corresponding shorter time delays and minimum wave form distortion than when either is used alone. Application of these principles to the pilot valve system produces an over-all power valve control which is very fast with good response linearity and which presents no valve stability difficulties.

Considering these features in more detail in the figures, it will be recalled that each valve stem and push rod or plunger for the pilot valves is made in two sections of different diameters, each fitting into guide bores having the same nominal diameters. They are maintained in compressive contact by the fluid forces on the valve stem working against the armature. If the right side of the armature, as viewed in Fig. 1, raises, the cavity at the junction of the two rods expands. The upper end of the valve stem 261 operates immersed in the hydraulic fluid which is drawn into the cavity thereabout past the clearance between the plunger 265 and its bore and the valve stem 261 and the bore in which it operates. For opposite armature motion, the cavity is diminished in volume by downward movement of plunger 265 which expels the fluid from the cavity in a manner similar to that in which it was drawn into the cavity.

Damping is provided that is essentially linear for a definite fluid viscosity since the relatively long leakage paths about the stem and plunger have linear viscous flow characteristics. The damping rate, again for a definite viscosity, is determined by the differential areas of the rods and the length and clearance of the rod in their bores.

Mechanical springs may be coupled to the armature in any conventional manner that avoids adding rotational friction to the movement of the armature. These springs may, as illustrated, form the hinges on which the armature pivots. With the arrangement illustrated, some friction is added since the armature translates laterally relative to the valve push rods due primarily to the pivoted connection to one of the spring mounting pads on the leg of the core. However, the magnitude of the friction thus developed is low since the versine for small angles of armature travel is negligible.

From the foregoing description, it will be appreciated that a valve mechanism and system has herein been provided which is relatively simple in construction with respect to operational requirements and which utilize physical components, such as the piston-operated seated-type valves, which are not critical in dimension and which, therefore, facilitate the construction. Moreover, such a valve arrangement provides a positive seal of the oil or hydraulic fluid at any of the power valves which measurably improves the performance of the system and moreover results in a structure having a long useful life with a minimum of maintenance. Additionally, all valve linkages are achieved by means of hydraulic fluid which means that the valves are self-adjusting, requiring no precise control of dimensions among mechanically connected valve parts or touchy adjustments which must be made during assembly, as in the case of spool valves which require exact fitting at the lands and close dimension control among mechanically connected components. Still further, the provision of the hydraulic linkage and the general geometry of the hydraulic system provides a system which is inherently force sensitive.

Additionally, a hydraulic valve arrangement is provided affording a reversible fluid output for the purpose of reversibly driving a load such as an aircraft control surface, not shown. Some applications do not require a reversible output of fluid pressure. Conventional hydraulic lifts are in this latter class.

For such an application, only half of the pilot valve system is required.

It will be appreciated by those skilled in the art from a study of the embodiment herein illustrated and described that numerous other variations in the disclosed subject matter, both as to construction and organization, may be made without departing from the spirit and scope of this invention. Accordingly, it is intended that the foregoing disclosure and illustrations of the drawings shall be interpreted only as illustrative of the principles of this invention and not construed in a limiting sense.

We claim as our invention:

1. Electromagnetic valve apparatus comprising, respective valve bodies of magnetic material, each valve body having an opening therein and a bore coaxially disposed of said opening, respective plunger means slidably fitted in the respective bores and each having an end portion disposed adjacent the associated opening for controlling fluid flow therethrough, an inverted T-shaped member of magnetic material mounting said valve bodies in side-by-side relation forming a three-legged magnetic structure in which the leg of the T-shaped member constitutes the center leg, an armature pivotally mounted on the end of the center leg and having end portions engageable with the respective remaining ends of said respective plunger means, coil means disposed in flux linkage with each valve body, and resilient means biasing said armature to a given angular position.

2. Electromagnetic valve apparatus comprising, respective valve bodies of magnetic material, each valve body having an opening therein and a bore coaxially disposed of said opening, respective plunger means slidably fitted in the respective bores and each having an end portion disposed adjacent the associated opening for controlling fluid flow therethrough, an inverted T-shaped member of magnetic material mounting said valve bodies in side-by-side relation forming a three-legged magnetic structure in which the leg of the T-shaped member constitutes the center leg, an armature pivotally mounted on the end of the center leg and having end portions engageable with the respective remaining ends of said respective plunger means, coil means disposed in flux linkage with each valve body, resilient means biasing said armature to a given angular position, and viscous damping means associated with each plunger means for damping movement of the respective plunger means.

3. Electromagnetic valve apparatus comprising, respective valve bodies each having an opening therein and a bore coaxially disposed of said opening, each opening comprising a pair of different diameter coaxially disposed bore sections, the smaller bore sections being adjacent said openings, a plunger slidably fitted in each bore section, the plungers in the smaller bore sections each having one end disposed adjacent the associated opening and each having the other end projecting into the associated larger diameter bore section in end-to-end relation with the associated larger diameter plunger, the fit of at least the respective smaller diameter plungers in their respective bore sections permitting oil leakage therepast into the respective larger diameter bore sections so that some of the energy of sliding movement is dissipated in work done pumping fluid and a degree of viscous damping thereby achieved, and electromagnetic means having an armature pivotally mounted between said valve bodies, the end portions of said armature being engageable with the respective remaining ends of the larger diameter plungers.

4. Electromagnetic valve apparatus comprising, respective valve bodies each having an opening therein and a bore coaxially disposed of said opening, each opening comprising a pair of different diameter coaxially disposed bore sections, the smaller bore sections being adjacent said openings, a plunger slidably fitted in each bore section, the plungers in the smaller bore sections each having one end disposed adjacent the associated opening and each having the other end projecting into the associated larger diameter bore section in end-to-end relation with the associated larger diameter plunger, the fit of at least the respective smaller diameter plungers in their respective bore sections permitting oil leakage therepast into the respective larger diameter bore sections so that some of the energy of sliding movement is dissipated in work done pumping fluid and a degree of viscous damping thereby achieved, electromagnetic means having an armature pivotally mounted between said valve bodies, the end portions of said armature being engageable with the respective remaining ends of the larger diameter plungers, and resilient means engaging said armature and biasing said armature to a given position.

5. Electromagnetic valve apparatus comprising, respective valve bodies each having an opening therein and a bore coaxially disposed of said opening, each opening comprising a pair of different diameter coaxially disposed bore sections, the smaller bore sections being adjacent said openings, a plunger slidably fitted in each bore section, the plungers in the smaller bore sections each having one end disposed adjacent the associated opening and each having the other end projecting into the associated larger diameter bore section in end-to-end relation with the associated larger diameter plunger, the fit of at least the respective smaller diameter plungers in their respective bore sections permitting oil leakage therepast into the respective larger diameter bore sections so that some of the energy of sliding movement is dissipated in work done pumping fluid and a degree of viscous damping thereby achieved, electromagnetic means having an armature, spring means pivotally mounting said armature between said valve bodies, the end portions of said armature being engageable with the respective remaining ends of the larger diameter plungers.

References Cited in the file of this patent

UNITED STATES PATENTS

| | | |
|---|---|---|
| 587,786 | Brown | Aug. 10, 1897 |
| 1,950,749 | Ross | Mar. 13, 1934 |
| 2,208,421 | Hanna | July 16, 1940 |
| 2,249,206 | Hubbard | July 15, 1941 |
| 2,398,681 | Weber | Apr. 16, 1946 |
| 2,473,038 | Rockwell | June 14, 1949 |
| 2,612,342 | Terry | Sept. 30, 1952 |
| 2,672,731 | Ashton | Mar. 23, 1954 |
| 2,717,340 | Waters | Sept. 6, 1955 |